(12) United States Patent
Palaniappan (10) Patent No.: US 9,521,213 B2
(45) Date of Patent: Dec. 13, 2016

(54) ELECTRONIC FULFILLMENT SYSTEM FOR DISTRIBUTING DIGITAL GOODS

(75) Inventor: Murugappan Palaniappan, Issaquah, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 2798 days.

(21) Appl. No.: 10/187,065

(22) Filed: Jun. 28, 2002

(65) Prior Publication Data

US 2013/0212686 A1    Aug. 15, 2013

(51) Int. Cl.
| | | |
|---|---|---|
| G06Q 20/00 | (2012.01) | |
| H04L 29/08 | (2006.01) | |
| H04L 29/06 | (2006.01) | |
| G06Q 30/04 | (2012.01) | |
| G06Q 30/06 | (2012.01) | |

(52) U.S. Cl.
CPC .............. *H04L 67/32* (2013.01); *G06Q 30/04* (2013.01); *G06Q 30/06* (2013.01); *H04L 63/123* (2013.01)

(58) Field of Classification Search
USPC ........................................................ 705/50
See application file for complete search history.

(56) References Cited

U.S. PATENT DOCUMENTS

| | | | | |
|---|---|---|---|---|
| 5,247,575 A * | 9/1993 | Sprague et al. | ................ | 705/53 |
| 5,563,946 A * | 10/1996 | Cooper et al. | .................. | 705/56 |
| 5,629,980 A * | 5/1997 | Stefik et al. | ..................... | 705/54 |
| 5,991,399 A * | 11/1999 | Graunke et al. | .............. | 380/279 |
| 6,389,403 B1 * | 5/2002 | Dorak, Jr. | ........................ | 705/52 |
| 6,850,915 B1 * | 2/2005 | Wiehler | .......................... | 705/57 |
| 6,850,973 B1 * | 2/2005 | Larson et al. | ................. | 709/221 |
| 6,850,979 B1 * | 2/2005 | Saulpaugh et al. | ........... | 709/225 |
| 6,859,791 B1 * | 2/2005 | Spagna et al. | ................... | 705/51 |
| 6,868,403 B1 * | 3/2005 | Wiser et al. | .................... | 705/51 |
| 6,876,644 B1 * | 4/2005 | Hsu et al. | ...................... | 370/338 |
| 6,895,005 B1 * | 5/2005 | Malin et al. | ................... | 370/389 |
| 6,898,618 B1 * | 5/2005 | Slaughter et al. | ............. | 709/203 |
| 6,917,976 B1 * | 7/2005 | Slaughter et al. | ............. | 709/226 |
| 7,047,411 B1 * | 5/2006 | DeMello et al. | .............. | 713/176 |
| 7,353,541 B1 * | 4/2008 | Ishibashi et al. | ............... | 726/26 |

(Continued)

OTHER PUBLICATIONS

Real Legacy Archive—Real.com; "RealPlayer 7 for Windows NT 4.0/98/ME/XP/2000—Download and Installation Instructions", http://forms.real.com/real/player/blackjack. html?platform2=WindowsNT4.0_/_98_/_ME_/_XP_/_2000 &product=RealPlayer_7&proc=pent&lang=en&show_list=0 ; "RealPlayer 7 Basic, Frequently Asked Questions", http://service. real.com/help/faq/rp7/rpb7faq.html, Dec. 28, 1999, RealNetworks released RealPlayer 7 Basic for Windows.

(Continued)

*Primary Examiner* — John Hayes
*Assistant Examiner* — John M Winter
(74) *Attorney, Agent, or Firm* — Finch & Maloney PLLC (57) ABSTRACT

Methods and apparatus for delivering digital goods using an electronic distribution system. Meta-information is generated for a digital product and stored at a fulfillment server. Upon completion of a transaction between a customer and the supplier of a digital product, a download manager installed at the customer's computer communicates with the fulfillment server using a protocol that ensures secure and reliable delivery of the digital product to the customer. In alternative implementations, the customer can be billed before or after successful delivery of the digital product to the customer.

12 Claims, 5 Drawing Sheets

(56) References Cited

U.S. PATENT DOCUMENTS

2002/0062357 A1\* 5/2002 Srinivasan .......... H04L 63/0428
709/219
2003/0014436 A1\* 1/2003 Spencer ................ G06Q 10/10
715/201

OTHER PUBLICATIONS

Ziplock System 3.0, "Building Blocks for Electronic Commerce," http://www.fillipdesign.com/portfolio/www/ziplock/system3/components/index.html; Copyright 1997 Portland Software.

\* cited by examiner

ELECTRONIC FULFILLMENT SYSTEM FOR DISTRIBUTING DIGITAL GOODS

BACKGROUND

The present invention relates to distributing digital goods electronically over a networked computer system.

Suppliers of large digital products, such as software applications, may choose to distribute the products on physical media, such as CD-ROMs, rather than making the products available for download over a networked computer system. While downloading the digital product may be more convenient for a customer, the network environment may not provide adequate reliability and security measures for such transactions.

For an electronic distribution system to be efficient, the system must ensure that the digital product delivered to a customer is complete and uncorrupted, and that the digital product is not intercepted by unauthorized parties during the delivery. An electronic distribution that ensures reliable and secure delivery of digital products may have several advantages over traditional, physical distribution systems. For example, material costs and costs associated with the manufacturing, packaging, transportation and storing of the packaged digital media may be avoided, and these cost savings can be enjoyed by both the supplier and the customers.

SUMMARY

In general, in one implementation, the invention provides methods and apparatus, including computer program products, implementing techniques for electronically distributing digital goods over a networked computer system. The goods can include digital products such as application programs, application installers, and content files, such as multi-media files.

The techniques include generating meta-information to assist in downloading the digital product, and storing the meta-information at a fulfillment server and storing the actual digital product at a hosting server. The meta-information can include, for example, the location (e.g., the URL) of the digital product, the size of the product, the store supplying the product, a unique transaction identifier, and instructions for performing actions to be taken automatically during or after the product is downloaded onto a client computer.

The digital product can be encrypted or digitally signed as a security measure prior to uploading the digital product to the hosting server 125. Information identifying the type of security measures taken can be stored with the meta-information at the fulfillment center along with any unlocking keys for encrypted products.

A customer can use a web browser on a client computer to visit a website hosted by a supplier of a digital product. Upon completing a transaction, such as an online sales or registration transaction, the supplier sends a download request to the fulfillment server. The fulfillment server verifies the request, and sends meta-information associated with the digital product to the client computer. A download manager at the client computer uses the meta-information to prepare the client computer for the download and then to download the product from its location at the hosting server. The download manager notifies the fulfillment server of a successful download, and the fulfillment server verifies the transaction, and then sends information for enabling the downloaded digital product back to the download manager. In an alternative implementation, the fulfillment server can get a confirmation from the supplier before sending information for enabling the downloaded digital product. This enabling information can include an unlocking key for an encrypted product or an indication that the product is digitally signed. The download manager uses the enabling information to enable the product. If the download manager receives a message from the fulfillment server indicating that the transaction is not authorized or does not receive the enabling information within a timeout period, the download manager may delete the downloaded product or the decrypted version of the downloaded product from the client computer. The download manager notifies the fulfillment server upon successfully downloading and enabling the digital product on the client computer. The fulfillment server then notifies the supplier that the transaction is complete. In an alternate implementation, the customer-supplier transaction, e.g., a credit card transaction, can be completed after successful delivery to the customer and notification to the supplier.

The invention can be implemented to realize a reliable and secure electronic distribution system. Digital products can be delivered in a manner that ensures that the customer receives the digital product in its complete and uncorrupted form and that unauthorized parties do not intercept the product during the delivery.

The details of one or more implementations of the invention are set forth in the accompanying drawings and the description below. Other features and advantages of the invention will become apparent from the description, the drawings, and the claims.

DETAILED DESCRIPTION

Figure 1:
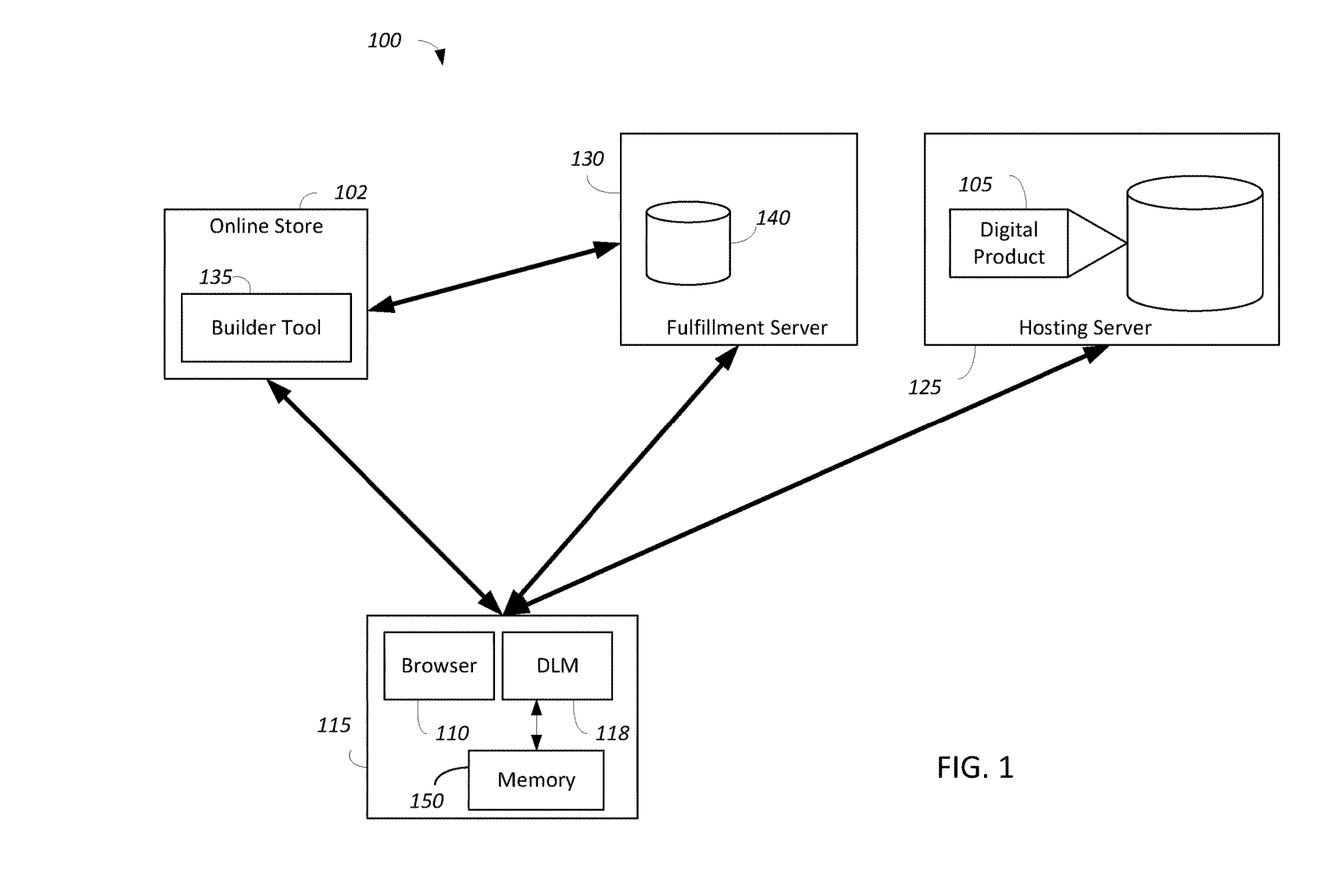
FIG. 1 is a block diagram of a system for electronically delivering digital goods over a networked computer system.

FIG. 1 illustrates a system 100 for electronically delivering digital goods over a networked computer system, such as the Internet. The digital goods can include different types of products in different formats, for example, software applications, application installers, and content files, such as text files, electronic books, movie files, audio files, etc.

A supplier of digital products, such as an online store 102 residing on a store server, hosts a website in which the supplier offers to sell or give away one or more digital products 105. A customer can visit the online store using a browser application 110 running on a client computer 115. The customer can select a digital product 105 from the website for purchase, and the online store 102 handles a sales transaction with the customer prior to downloading the purchased product to the client computer. The customer can purchase multiple digital products, which may be of different types, all of which can be delivered in the same download.

The client computer includes a software agent that serves as a download manager 118. The download manager 118 uses meta-information associated with a digital product 105 to manage the actual download of the product over the network. The meta-information can include, for example, where the product is hosted, the product's size, the store that originated the transaction, and a unique transaction identifier assigned by the store. The download manager 118 also verifies digitally signed products and decrypts encrypted digital products.

The actual digital product 105 to be downloaded is stored at a hosting server 125. A fulfillment server 130 initiates downloads for products supplied by one or more stores from one or more hosting servers 125. To initiate a download, the fulfillment server 130 transmits meta-information about the product to the client computer 115. The fulfillment server 130 also confirms successful delivery to the store.

Figure 2:
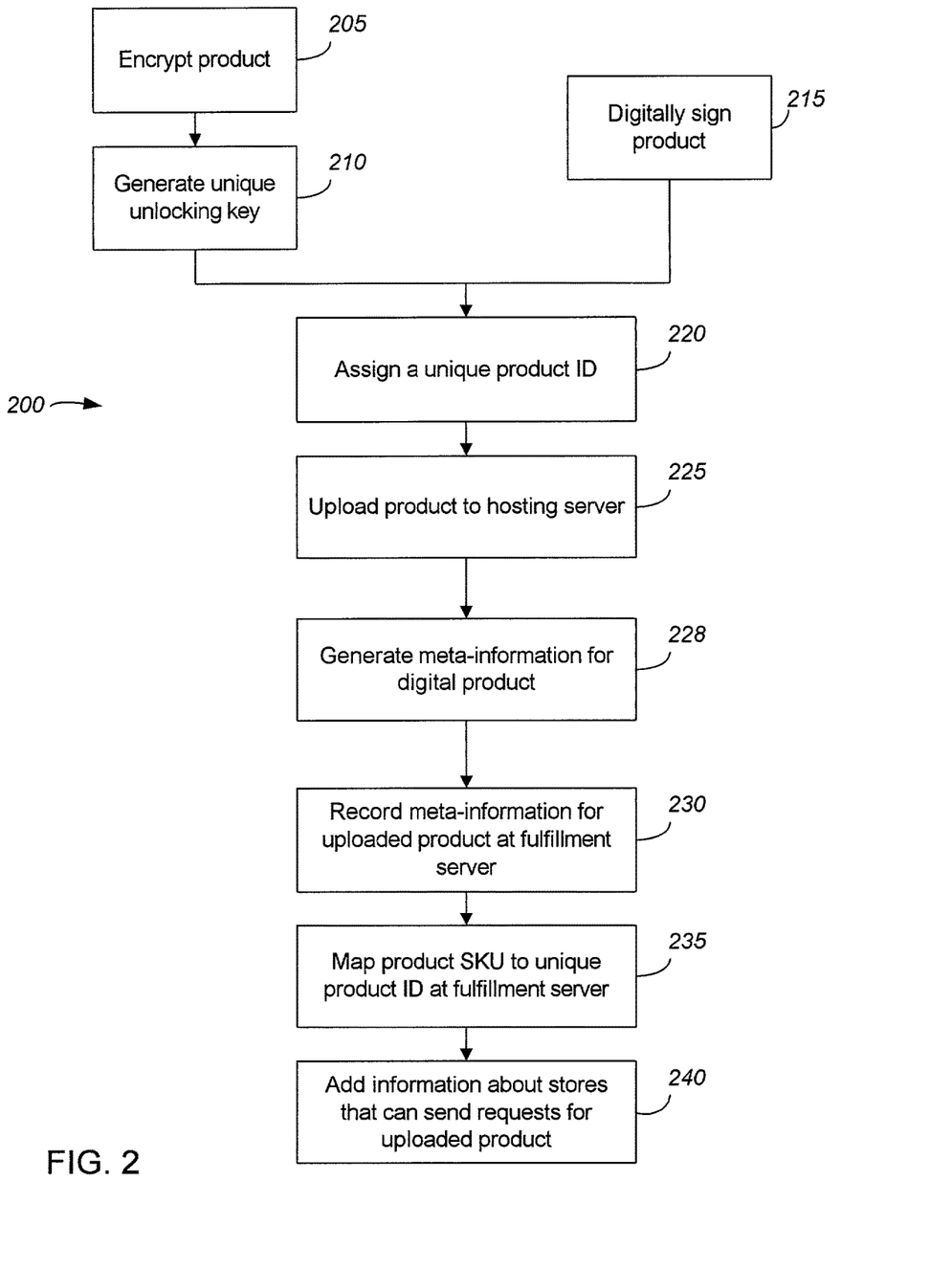
FIG. 2 shows a flowchart describing an operation for preparing a digital product for distribution in the system shown in FIG. 1.

A builder tool 135 may be used by the store 102 to prepare the digital product 105 for distribution in the system. FIG. 2 is a flowchart describing an operation 200 the builder tool performs to prepare a digital product 105 for distribution in the system 100.

The builder tool 135 encrypts or digitally signs the digital product 105. For encrypted products, the appropriate encryption algorithm is added to the builder tool 135, and the corresponding decryption algorithm is added to the appropriate version of the download manager 118 at the fulfillment server 130. The builder tool 135 uses the encryption algorithm to encrypt the product (step 205) and to generate a unique unlocking key for each product (step 210). For digitally signed products, the builder tool 135 uses a certificate obtained from a certification authority to sign the digital product 105 (step 215). The encrypted or digitally signed product is then assigned a unique product identifier (step 220) and uploaded into the hosting server 125 (step 225).

In one implementation, the builder tool can have an array of encryption algorithms, and the download manager can have a corresponding array of decryption algorithms. The fulfillment server can send information to the download manager along with the decryption key that identifies which algorithm was used by the builder tool to encrypt the product.

The builder tool 135 may also generate the meta-information for the digital product (step 228). The meta-information can include the URL (Uniform Resource Locator) describing the location of the uploaded digital product 105. The meta information can also include an indication of whether the product is encrypted or digitally signed, the unique product identifier, and any unique unlocking key, in addition to the attributes previously described. The meta-information for the digital product 105 uploaded to the hosting server 125 is recorded in a database 140 at the fulfillment server 130 (step 230).

An SKU (Stock-Keeping Unit) identifying the product may be mapped to the unique product identifier of the digital product 105 and kept as a separate record on the fulfillment server's database 140 (step 235). Multiple products can be sold at the store 102 but delivered in the same download by mapping multiple SKUs to a single product identifier. The mapping between the SKU and the product identifier may be done by the builder tool 135 or the fulfillment server 130.

Information about the stores that have uploaded products to the hosting server 125, and hence can send requests to the fulfillment server 130, are stored in the fulfillment center's database 140 (step 240). The store information can include a unique store identifier and a unique signing key for verifying transaction requests sent by the store 102.

Figure 3:
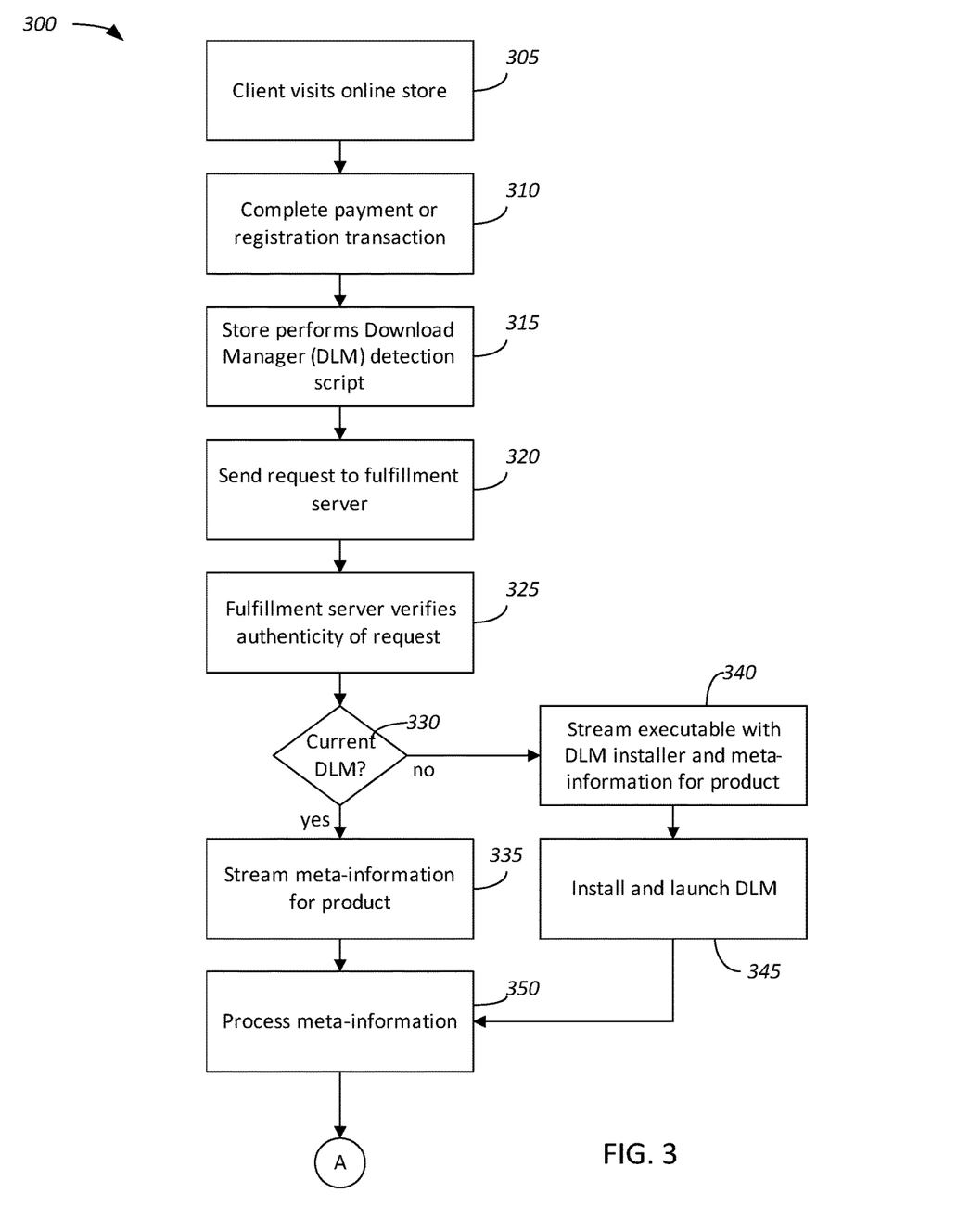
FIGS. 3-5 show a flowchart describing a method for distributing digital products over a networked computer system.
Figure 4:
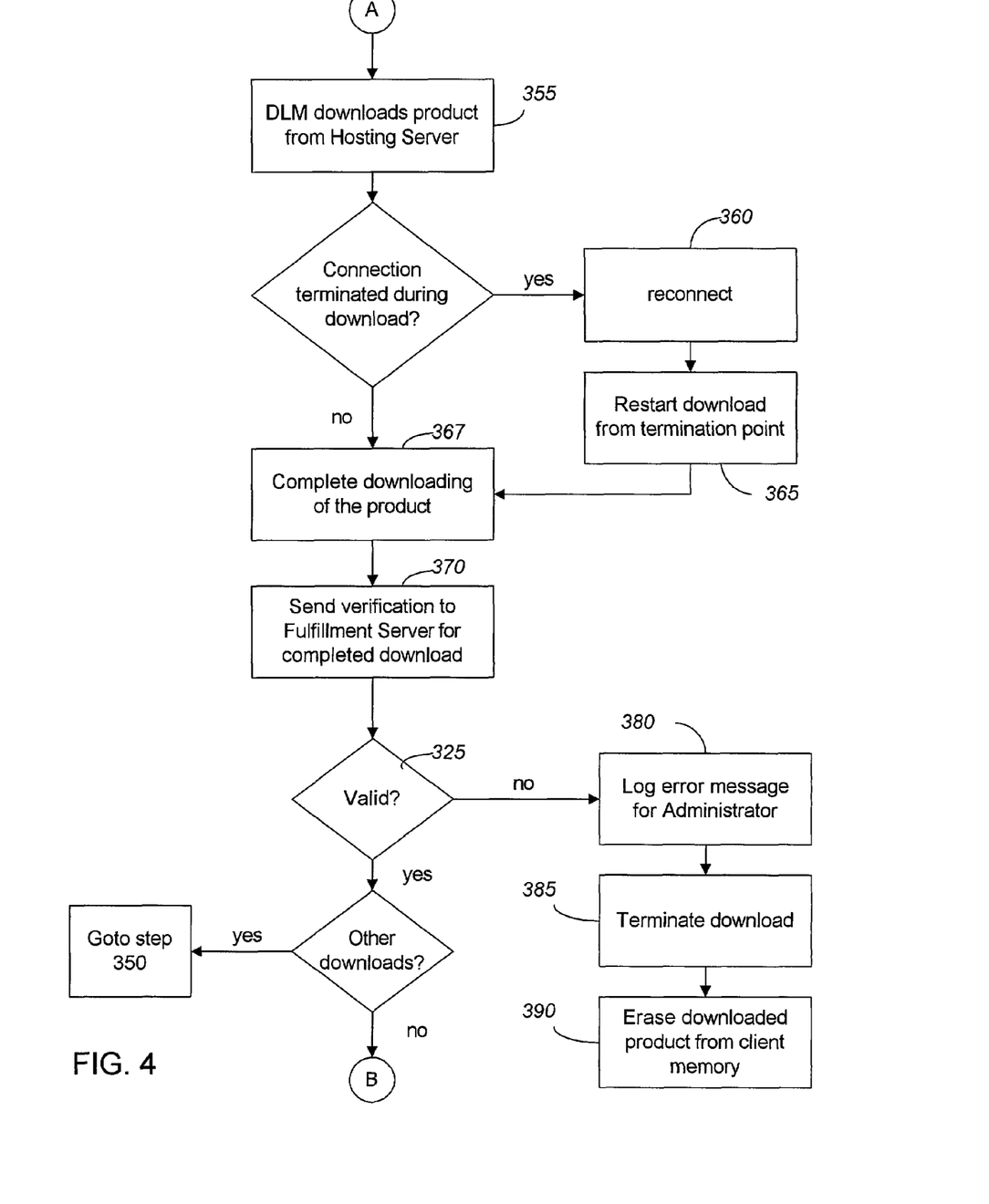
Figure 5:
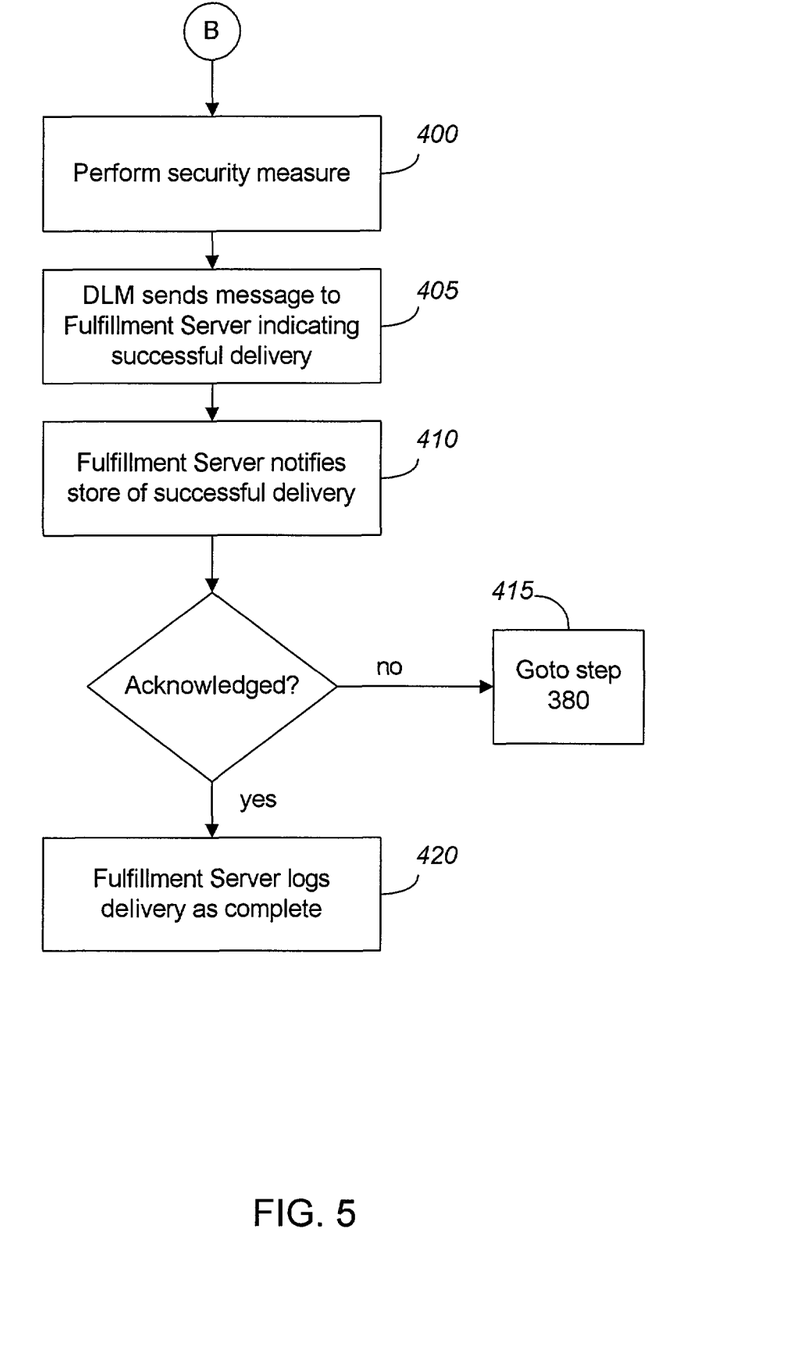

FIGS. 3-5 show a flowchart describing a method 300 for distributing digital products over a networked computer system. A customer visits the online store 102 using the browser 110 (step 305). The store offers digital products for sale or free of charge. Upon deciding to download a product, the customer completes a purchase transaction with the store 102, for example, an online credit card transaction or account transfer, or some type of a registration for a free product (step 310). The customer then initiates the download, for example, by selecting a "Download" button in the store's web page.

The store 102 uses a browser detection script to determine whether the client computer 115 has the correct version of the download manager 118 for downloading the selected digital product (step 315). The store then sends a digitally signed request to the fulfillment server 130 (step 320). The request can include information identifying the version of the download manager 118 on the client computer 115 (if any), the platform the client computer 115 is running (e.g., Windows® 2000), a product identifier, a store identifier, and a unique transaction identifier within the store.

The fulfillment server 130 looks up the store's unique signing key from the database 140 and verifies the authenticity of the request (step 325). The fulfillment server 130 looks up the appropriate product identifier corresponding to each SKU from the mapping information in the database 140. For each product, the corresponding product information (e.g., hosting server 125 URL, product size, unique product identifier, and store identifier) and a fulfillment server identifier are sent to the download manager 118. At this time a separate record is kept in the fulfillment center's database 140 that this transaction is pending. The pending record information can include the store identifier, product identifiers and SKUs, a transaction identifier, and pending status.

The fulfillment server 130 uses the information in the request to determine whether the client computer 115 has the correct version of the download manager 118 to handle the downloading of the digital product 102 from the host server 125 (step 330). If the client computer 115 has the correct version of the download manager 118, the fulfillment server 130 dynamically streams the meta-information associated with the purchased product to the client computer 115 (step 335). If the client computer 115 does not have the proper version of the download manager 118, the fulfillment server 130 dynamically streams a download manager installer for the client computer's platform along with the meta-information about the purchased product (step 340). The browser 110 then prompts the customer to install and launch the download manager 118 (step 345), which then processes the meta-information (step 350). Alternatively, the browser 110 can automatically install and launch the download manager 118, which then processes the meta-information.

The download manager 118 uses the meta-information to prepare the client computer 115 for the download. This can include performing any necessary disk space and write access checks and allocating memory 150 for the downloaded digital product. The download manager 118 establishes a link with the hosting server 125 using the URL in the meta-information to download the product (step 355, FIG. 4). The hosting server 125 uses a network protocol such as HTTP (Hypertext Transfer Protocol) 1.1 (as defined by RFC 2161 (1999)) to transmit the product to the client computer 115.

In the event the connection is terminated before the download is complete, the download manager 118 can inform the customer that the download was incomplete. For example, if the client computer 115 is powered off during the download, the next time the client computer starts up, the download manager 118 can prompt the customer to reconnect and complete the download. With the customer's consent, the download manager 118 will reconnect to the hosting server 125 (step 360) and continue to download the product from the point at which the download terminated, e.g., at some byte location in the middle of the digital product code or data (step 365).

Once the download is complete (step 367), the download manager 118 verifies the transaction by sending a message including the product identifier, store identifier, and the unique transaction identifier to the fulfillment server 130 (step 370). The download manager 118 uses a redirecting web script to redirect the message to the correct fulfillment server 130 based on the store identifier. The fulfillment server 130 then verifies whether the transaction is valid (step 375). The fulfillment sever can verify the transaction using internal records of pending transactions or by contacting the appropriate online store.

If the transaction was not valid, the fulfillment server 130 sends an error message to the download manager 118 and logs an error message for a fulfillment system administrator (step 380). The download manager 118 then terminates any further downloads (step 385). The download manager 118 can notify the customer with an error message and then delete the downloaded product from the client computer's memory 150 (step 390).

If the transaction is valid, the fulfillment server 130 returns a key to decrypt the product (if encrypted) or returns a message indicating that the digital product 105 is digitally signed. The download manager 118 then performs a security measure needed to prepare the product for use, e.g., decryption or verification of a digital signature (step 400, FIG. 5). Once this security measure is performed, the download manager 118 sends a message to the fulfillment server 130 indicating that the transaction is complete from the customer's viewpoint (step 405).

When the fulfillment server 130 receives notification from the download manager 118 that the product has been successfully delivered to the customer, the fulfillment server 130 notifies the store 102 of the settlement. The notification can include, for example, the time and date of the settlement. The fulfillment server can notify the store directly or indirectly, e.g., through an administrative entity in the distribution system. If the notification is not acknowledged by the store 102, either because the store did not initiate the transaction or because the store is not available, an error is logged and the fulfillment system administrator is notified (step 415). If the notification is acknowledged, the transaction is complete from the fulfillment center's viewpoint (step 420). In an alternative implementation, the store 102 may complete the online sale transaction for the download after receiving the notification from the fulfillment server 130 that the delivery was successful, rather than completing the transaction before the download is initiated.

The format and handling of the meta-information associated with the digital products can be an open protocol between the download manager 118 and the fulfillment server 130 used to establish a desired behavior for each downloaded product. For example, the meta-information may indicate whether the customer will be allowed to cancel the download once the download is initiated. The meta-information can also indicate whether a file should be downloaded to a specific directory (absolute or relative path) on the client computer 115.

The meta-information can be sent in an XML (Extensible Markup Language) file including customized tags. The XML file can include tags organized in a tree-structure. The meta-information can indicate whether a file is dependent on any other downloaded file that is part of the transaction. The meta-information can include instructions for performing any action or sequence of actions which should be taken on the file once a download is complete. For example, the meta-information can instruct the download manager 118 to satisfy any dependencies, launch the file as an executable, or, for a content file, open the file in an application associated with that file type. If the application(s) needed to present the digital product is not on the customer's computer, the meta-information can instruct the download manager to prompt the user to, or automatically, download and launch the missing application.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, the steps of the methods described herein need not be performed in the order described. Accordingly, other embodiments are within the scope of the following claims.

What is claimed is:

1. A method for providing verification information for digital products, the method comprising:
   receiving, by a fulfillment server system from one of multiple supplier systems, an unlocking key associated with an encrypted digital product, wherein the encrypted digital product is stored at a host system that is different from the supplier systems and the fulfillment server system;
   storing the received unlocking key by the fulfillment server system;

receiving, by the fulfillment server system from a particular one of the supplier systems, a notification indicating a download transaction for the encrypted digital product by a client system, wherein the notification identifies the particular supplier system and the download transaction;

making a determination that the client system does not have a correct version of a download manager to handle accessing the encrypted digital product from the host system;

adding, by the fulfillment server system, a decryption algorithm to the correct version of the download manager, wherein the decryption algorithm is capable of decrypting the encrypted digital product when used in conjunction with the unlocking key;

in response to making the determination, sending the correct version of the download manager to the client system;

saving, by the fulfillment server system, a transaction record associated with the download transaction, wherein the transaction record identifies the download transaction and the particular supplier system;

dynamically streaming meta-information from the fulfillment server system to the client system, wherein the meta-information includes instructions that, when executed, cause the download manager to (a) generate a message indicating a successful downloading of the encrypted digital product from the host system, and (b) use a redirecting web script to redirect the generated message from the client system to the fulfillment server;

verifying, by the fulfillment ver system, that the successful downloading indicated in the message received from the client system corresponds to the download transaction indicated in the notification received from the particular supplier system;

in response to said verifying, accessing, by the fulfillment server system, the unlocking key for the encrypted digital product;

transmitting, by the fulfillment server system to the client system, the unlocking key for the encrypted digital product;

determining, after transmitting the unlocking key to the client system; that the encrypted digital product downloaded from the host system has been unlocked; and in response to determining that the encrypted digital product has been unlocked, transmitting, by the fulfillment server system to the supplier system identified in the saved transaction record, a message indicating that the download transaction identified in the saved transaction record is complete.

2. The method of claim 1, wherein determining that the encrypted digital product downloaded from the host system has been unlocked further comprises determining that the encrypted digital product has been unlocked using the unlocking key.

3. The method of claim 1, wherein
the unlocking key specifies that the encrypted digital product digitally signed, and
transmitting the unlocking key comprises transmitting an indication that the encrypted digital product is digitally signed.

4. The method of claim 1, wherein said verifying that the successful in the message received from the client system corresponds to the download transaction indicated in the notification received from the particular supplier system comprises querying the supplier system identified in the saved transaction record for a status of the download transaction.

5. A non-transitory computer-readable medium encoding instructions that, when executed by a programmable processor, cause the programmable processor to perform operations comprising:

receiving, from one of multiple supplier systems, an unlocking key associated with an encrypted digital product, wherein the encrypted digital product is stored at a host system that is different from the supplier systems;

storing the received unlocking key;

receiving, from a particular one of the supplier systems, a notification indicating a download transaction for the encrypted digital product by a client system, wherein the notification identifies the particular supplier system and the download transaction;

making determination that the clients stem does not have a correct version of a download manager to handle accessing the encrypted digital product from the host system;

adding a decryption algorithm to the correct version of the download manager, wherein the decryption algorithm is capable of decrypting the encrypted digital product when used in conjunction with the unlocking key;

in response to making the determination, sending the correct version of the download manager to the client system;

saving a transaction record associated with the download transaction, wherein the transaction record identifies the download transaction and the particular supplier system;

dynamically streaming meta-information to the client system, wherein the meta-information includes instructions that, when executed, cause the download manager to generate a message indicating a successful downloading of the encrypted digital product from the host system;

receiving, from the client system, the message generated by the download manager;

verifying that the successful downloading indicated in the message received from the client system corresponds to the download transaction indicated in the notification received from the particular supplier system;

in response to said verifying, accessing the unlocking key for the encrypted digital product;

transmitting, to the client system, the unlocking key for the encrypted digital product;

determining, after transmitting the unlocking key to the client system, that the encrypted digital product downloaded from the host system has been unlocked; and in response to determining that the encrypted digital product has been unlocked, transmitting, to the supplier system identified in the saved transaction record, a message indicating that the download transaction identified in the saved transaction record is complete.

6. The non-transitory computer-readable medium of claim 5, wherein determining that the encrypted digital product downloaded from the host system has been unlocked further comprises determining that the encrypted digital product has been unlocked using the unlocking key.

7. The non-transitory computer-readable medium of claim 5, wherein
the unlocking key specifies that the encrypted digital product is digitally signed, and transmitting the unlocking key comprises transmitting an indication that the encrypted digital product is digitally signed.

8. The non-transitory computer-readable medium of claim 5, wherein verifying that the successful downloading indicated in the message received from the client system corresponds to the download transaction indicated in the notification received from the particular supplier system comprises querying the supplier system identified in the saved transaction record for a status of the download transaction.

9. A fulfillment server system comprising:
a processor configured to communicatively couple the fulfillment server system to multiple supplier systems and a client system;
a non-transitory computer-readable medium encoding instructions that, when executed by the processor, cause the fulfillment server system to perform operations comprising receiving, from one of the supplier systems, an unlocking key associated with an encrypted digital product that is stored at a host system that is different from the fulfillment server system and each of the supplier systems; and
a machine-readable storage device storing the received unlocking key,
wherein the instructions, when executed by the processor, cause the fulfillment server system to perform further operations comprising:
receiving, from a particular one of the supplier systems, a notification indicating a download transaction for the encrypted digital product by the client system, wherein the notification identifies the particular supplier system and the download transaction;
making a determination that the client system does not have a correct version of a download manager to handle accessing the encrypted digital product from the host system;
adding, by the fulfillment server system, a decryption algorithm to the correct version of the download manager, wherein the decryption algorithm is capable of decrypting the encrypted digital product when used in conjunction with the unlocking key;
in response to making the determination, sending the correct version of the download manager to the client system;
saving a transaction record associated with the download transaction, wherein the transaction record identifies the download transaction and the particular supplier system;
dynamically streaming meta-information to the client system, wherein the meta-information includes instructions that, when executed by the client system, cause the download manager to (a) generate a message indicating a successful downloading of the encrypted digital product from the host system, and (b) use a redirecting web script to redirect the generated message from the client system to the fulfillment server;
verifying that the successful downloading indicated in the message received from the client system corresponds to the download transaction indicated in the notification received from the particular supplier system;
in response to said verifying, accessing the unlocking key for the encrypted digital product;
transmitting, to the client system, the unlocking key for the encrypted digital product;
determining, after transmitting the unlocking key to the client system, that the encrypted digital product downloaded from the host system has been unlocked; and
in response to determining that the encrypted digital product has been unlocked, transmitting, to the supplier system identified in the saved transaction record, a message indicating that the download transaction identified in the saved transaction record is complete.

10. The system of claim 9, wherein determining that the encrypted digital product downloaded from the host system has been unlocked further comprises determining that the encrypted digital product has been unlocked using the unlocking key.

11. The system of claim 9, wherein
the unlocking key specifies that the encrypted digital product is digitally signed, and
transmitting the unlocking key comprises transmitting an it dication that the encrypted digital product is digitally signed.

12. The system of claim 9, wherein verifying that the successful downloading indicated in the message received from the client system corresponds to the download transaction indicated in the notification received from the particular supplier system comprises querying the supplier system identified in the saved transaction record for a status of the download transaction.

* * * * *

UNITED STATES PATENT AND TRADEMARK OFFICE
CERTIFICATE OF CORRECTION

PATENT NO. : 9,521,213 B2
APPLICATION NO. : 10/187065
DATED : December 13, 2016
INVENTOR(S) : Palaniappan It is certified that error appears in the above-identified patent and that said Letters Patent is hereby corrected as shown below:

In the Claims

Column 7, Line 33, Claim 1, replace "fulfillment ver system," with --fulfillment server system,--.

Column 7, Line 45, Claim 1, replace "system; that" with --system, that--.

Column 7, Line 60, Claim 3, replace "product digitally" with --product is digitally--.

Column 7, Line 65, Claim 4, replace "successful in" with --successful downloading indicated in--.

Column 8, Line 20, Claim 5, replace "making determination that the clients stem does" with --making a determination that the client system does--.

Column 10, Lines 38 - 39, Claim 11, replace "an it dication that" with --an indication that--.

Signed and Sealed this
Twenty-first Day of February, 2017

Michelle K. Lee
*Director of the United States Patent and Trademark Office*